(12) United States Patent
Ferenc

(10) Patent No.: US 9,701,227 B2
(45) Date of Patent: Jul. 11, 2017

(54) ASSEMBLY GROUP OF A VEHICLE SEAT COMPRISING A TUBE ELEMENT AND AN ATTACHMENT PART ARRANGED THEREON

(71) Applicant: Brose Fahrzeugteile GmbH & Co. Kommanditgesellschaft, Coburg, Coburg (DE)

(72) Inventor: Anthony Ferenc, Goodrich, MI (US)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 0 days.

(21) Appl. No.: 14/878,236

(22) Filed: Oct. 8, 2015

(65) Prior Publication Data

US 2017/0101037 A1    Apr. 13, 2017

(51) Int. Cl.
*B60N 2/44* (2006.01)
*B21D 22/02* (2006.01)

(52) U.S. Cl.
CPC ............. *B60N 2/44* (2013.01); *B21D 22/025* (2013.01)

(58) Field of Classification Search
CPC ................................ B60N 2/44; B21D 22/025
USPC ............ 297/344.15, 344.16, 344.17, 452.18, 297/452.2
See application file for complete search history.

(56) References Cited

U.S. PATENT DOCUMENTS

| | | | |
|---|---|---|---|
| 5,690,459 A | 11/1997 | Donovan et al. | |
| 6,077,014 A | 6/2000 | Gulistan | |
| 6,698,081 B2 | 3/2004 | Oates et al. | |
| 7,316,454 B2 * | 1/2008 | Yoshida | B60N 2/165 297/344.15 X |
| 8,172,326 B2 * | 5/2012 | Adragna | B60N 2/1615 297/344.15 |
| 8,322,675 B2 | 12/2012 | Ducreuzot | |

(Continued)

FOREIGN PATENT DOCUMENTS

| | | |
|---|---|---|
| DE | 197 27 310 A1 | 1/1999 |
| DE | 103 21 745 A1 | 8/2004 |

(Continued)

OTHER PUBLICATIONS

International Search Report issued in corresponding PCT Application No. PCT/EP2016/073927 dated Feb. 6, 2017 (5 pages) and Written Opinion (5 pages).

*Primary Examiner* — Rodney B White
(74) *Attorney, Agent, or Firm* — Lewis Roca Rothgerber Christie LLP

(57) ABSTRACT

An assembly group of a vehicle seat comprises a tube element having a tube section extending along a longitudinal direction and a bead section formed on the tube element and radially protruding with respect to the tube section. An attachment part is connected in a torsionally locked manner to the tube element and has a planar section and a first opening formed in the planar section, wherein the tube element extends through the first opening such that the tube element with the bead section abuts the planar section of the attachment part. The attachment part comprises at least a second opening separate from the first opening. The bead section comprises at least one protrusion element engaging with the at least one second opening for torsionally locking the tube element with respect to the attachment part.

18 Claims, 4 Drawing Sheets

(56) References Cited

U.S. PATENT DOCUMENTS

| | | | |
|---|---|---|---|
| 8,894,143 B2 * | 11/2014 | Schuler | B60N 2/0232 297/344.15 X |
| 9,045,061 B2 | 6/2015 | Kostin et al. | |
| 9,126,518 B2 * | 9/2015 | Adragna | B60N 2/1615 |
| 2004/0135411 A1 | 7/2004 | Hensley et al. | |
| 2008/0307624 A1 | 12/2008 | Lee | |
| 2011/0221248 A1 * | 9/2011 | Schuler | B60N 2/0232 297/330 |

FOREIGN PATENT DOCUMENTS

| | | |
|---|---|---|
| DE | 20 2005 009 185 U1 | 11/2006 |
| DE | 10 2010 008 676 A1 | 10/2010 |
| DE | 10 2013 001 416 A1 | 7/2014 |
| DE | 10 2013 209 948 A1 | 12/2014 |
| DE | 10 2014 202 086 B3 | 2/2015 |
| DE | 10 2013 112 462 A1 | 5/2015 |
| EP | 1 820 579 A1 | 8/2007 |
| EP | 2 027 951 A1 | 2/2009 |

\* cited by examiner

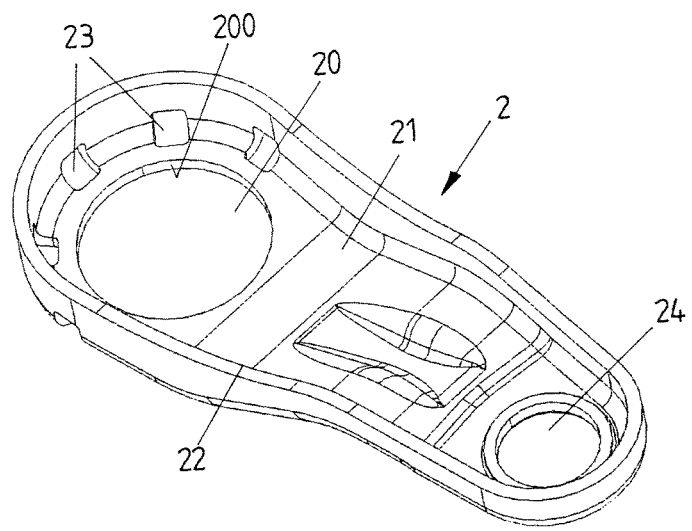
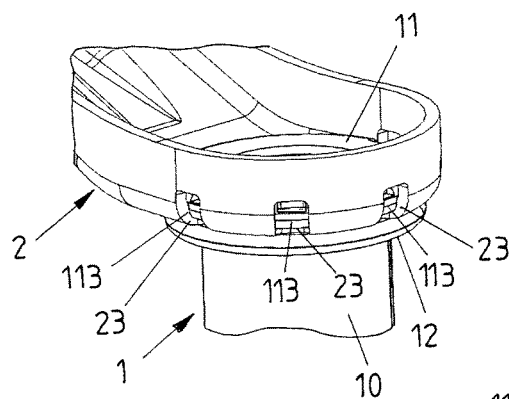
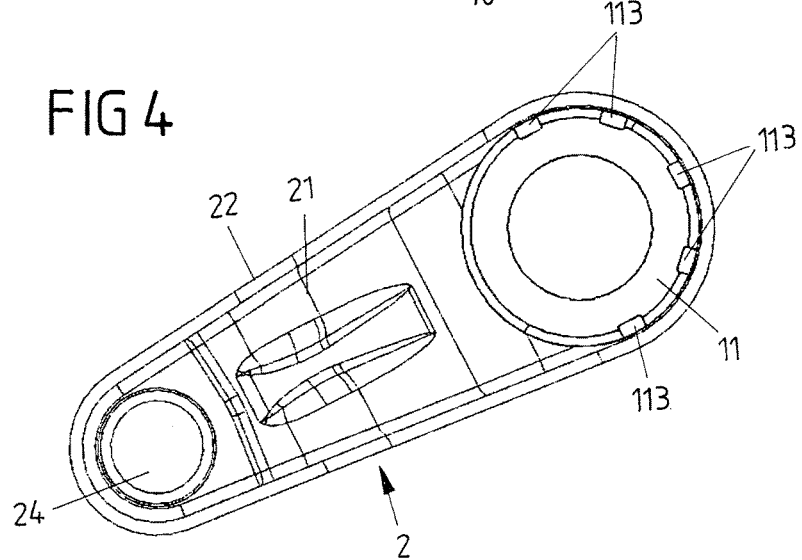

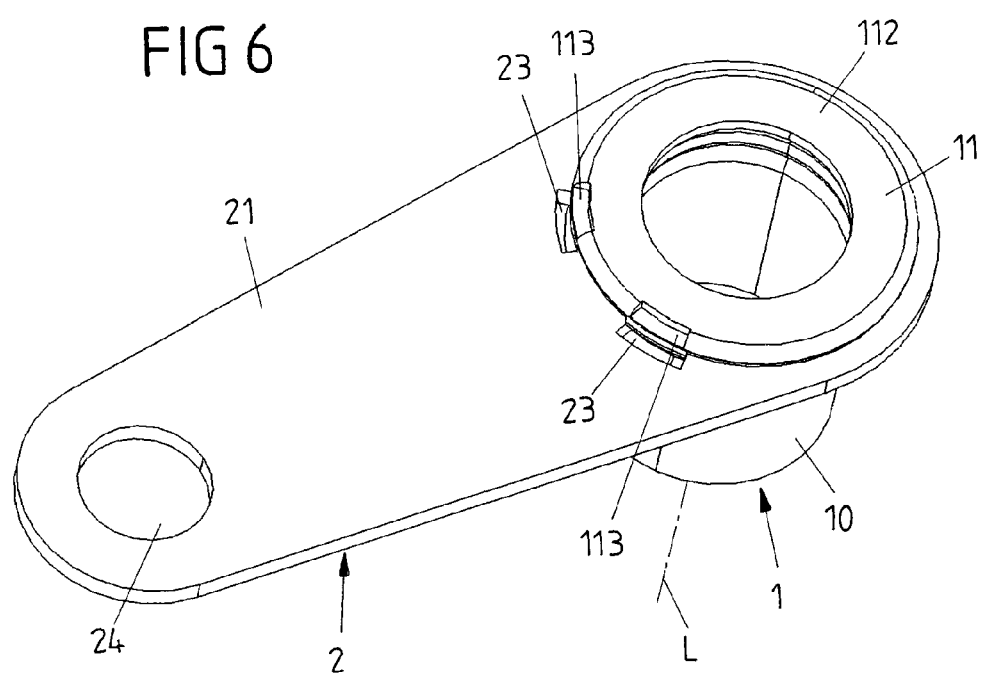
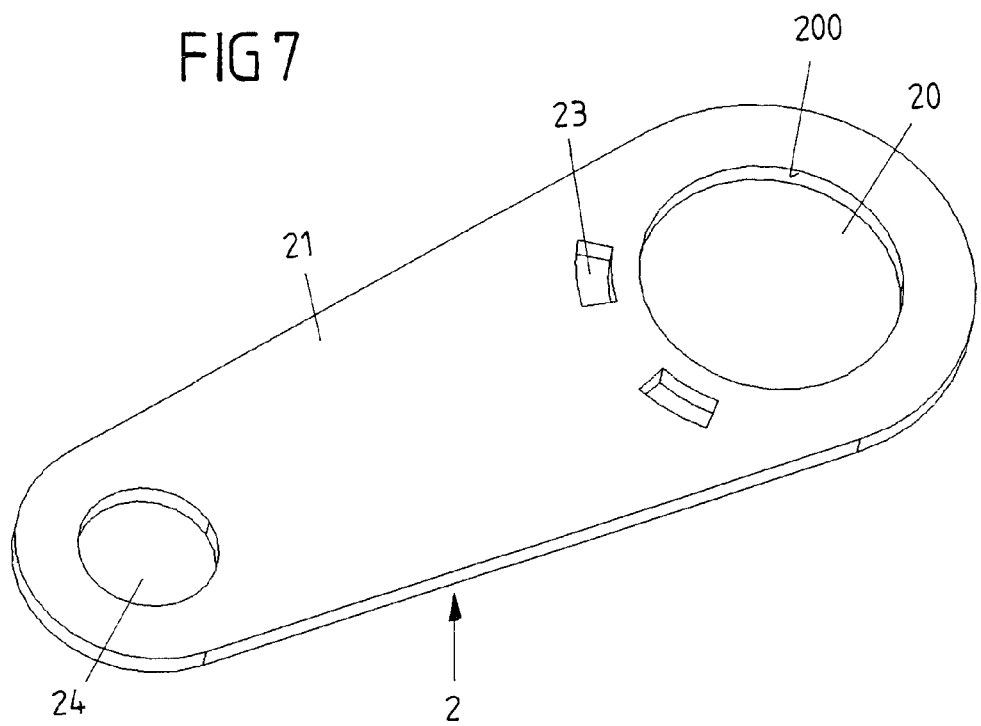

ASSEMBLY GROUP OF A VEHICLE SEAT COMPRISING A TUBE ELEMENT AND AN ATTACHMENT PART ARRANGED THEREON

TECHNICAL FIELD

The instant invention relates to an assembly group of a vehicle seat and to a method for manufacturing an assembly group of a vehicle seat.

BACKGROUND

An assembly group of a vehicle seat comprises a tube element having a tube section extending along a longitudinal direction and a bead section formed on the tube element and radially protruding with respect to the tube section. An attachment part is connected in a torsionally locked manner to the tube element and comprises a planar section and a first opening formed in the planar section. The tube element, when it is connected to the attachment part, extends through the first opening such that tube element with the bead section abuts the planar section of the attachment part.

A tube element of this kind may for example constitute a transverse tube of a vehicle seat extending in between frame parts of a seat part of the vehicle seat. The tube element may for example be mounted in a rotatable manner on the frame parts such that it can be rotated with respect to the frame parts. The attachment part in this case may for example be a link of a height adjustment mechanism of the vehicle seat, the link being connected pivotably to for example a guide rail such that, by pivoting the link, the vehicle seat can be adjusted in its height position.

Within a height adjustment mechanism of this kind the link can be pivoted for example by rotating the tube element. For this, the tube element and the attachment part in the shape of the link are connected to each other in a torsionally fixed manner such that torsional forces can be transferred between the tube element and the attachment part.

EP 1 820 579 A1 discloses a tube element connected to a flange. For this, two bead sections, also denoted as scaffolds, are formed on the tube element, the bead sections receiving the flange in between themselves. For torsionally locking the flange to the tube element, locking projections are formed on one of the bead sections to engage with an outer contour of a central opening through which the tube element extends.

U.S. Pat. No. 8,322,675 discloses a vehicle seat comprising a seat part and a height adjustment mechanism comprising a link having a bore which comprises at least one substantially radial notch. A tube extends through the bore and comprises, on a bead, at least one projection extending into the notch for torsionally locking the tube to the link.

SUMMARY OF THE INVENTION

It is an object to improve a torsional lock in between a tube element and an attachment part.

It is a further object to form a torsional lock by which forces acting between the tube element and the attachment part may be received in a beneficial manner.

In a first aspect, an assembly group of a vehicle seat comprises: a tube element having a tube section extending along a longitudinal direction and a bead section formed on the tube element and radially protruding with respect to the tube section; an attachment part connected in a torsionally locked manner to the tube element and having a planar section and a first opening formed in the planar section, wherein the tube element extends through the first opening such that the tube element within the bead section abuts the planar section of the attachment part; wherein the attachment part comprises at least a second opening separate from the first opening; and wherein the bead section comprises at least one protrusion element engaging with the at least one second opening for torsionally locking the tube element with respect to the attachment part.

The bead section hence comprises at least one protrusion element engaging with at least one second opening of the attachment part for torsionally locking the tube element with respect to the attachment part. The at least one second opening is separate from the first opening, such that the at least one protrusion element engages with an opening separate from the opening through which the tube element extends.

In one aspect, the at least one second opening may be placed radially outside of the first opening, which for example may have a circular shape. Because the protrusion element may engage with a second opening having a radial distance from the first opening, the torsional lock between the tube element and the attachment part is achieved at a radially outer position, thus allowing for a beneficial lever arm to receive forces acting in between the tube element and the attachment part.

It is to be noted that the first opening may, in one embodiment, have a circular shape, but may in another embodiment have any other, non-circular shape, for example a square shape or an irregular shape.

Also, the tube element may, in one embodiment, have a circular cross-section, but may in another embodiment have any other, non-circular shape, for example a square shape or an irregular shape.

In one aspect, the at least one protrusion element protrudes axially and/or radially with respect to the longitudinal direction from the bead section. By projecting from the bead section, the at least one protrusion element reaches into the at least one second opening formed on the attachment part such that a torsional lock between the tube element and the attachment part is established.

The at least one protrusion element may for example be formed on the bead section by stamping.

In one aspect, the at least one protrusion element may be formed on a radially outer edge of the bead section. Hence, the at least one protrusion element is formed at a radially outer position on the bead section, which allows to receive torsional forces acting in between the tube element and the attachment part in a beneficial manner because an increased lever arm for receiving torsional forces is provided. In addition, the manufacturing of the bead section on the tube element may be eased, because the forming of the protrusion element on the bead section takes place at a radially outer position at which a deformation can take place at a reduced risk to damage the tube element at the bead section. Because the one or the multiple protrusion elements are formed at a radially outer position on the bead section, the protrusion elements are formed at a location at which the bead section (formed by a deformation of the tube element through cold forming or hot forming) has an increased radius with respect to a radius at an inner transition zone between the bead section and a regular, non-deformed tube section of the tube element. In particular for tube elements made of a high-strength steel the forming of protrusion elements at a radially outer position on the bead section may offer advantages.

In one aspect, the attachment part comprises a multiplicity of second openings which are arranged radially outside of the first opening and are displaced with respect to one another. At least one protrusion element engages with at least one of the second openings to provide a torsionally locking between the tube element and the attachment part.

Herein, in one embodiment, with each second opening one protrusion element may engage. Hence, on the bead section as many protrusion elements are formed as second openings are present on the attachment part such that one protrusion element is assigned to and engages with each second opening present.

The multiplicity of second openings may be arranged regularly around the first opening such that neighboring second openings are spaced apart from one another (when viewed along a circumferential direction about the longitudinal direction) at equal distances.

It however is also conceivable to place the second openings irregularly about the first opening at unequal distances.

In one aspect, at least one second opening may be formed on the planar section. In addition or alternatively, at least one second opening may be formed on a flange of the attachment part, the flange protruding axially along the longitudinal direction from the planar section and extending for example around the planar section to encompass the planar section. To engage with a second opening formed on the planar section, a protrusion element protrudes axially from the bead section. To engage with a second opening formed in a flange, a protrusion element may protrude axially and/or radially from the bead section.

The first opening through which the tube element extends when attached to the attachment part may for example have a circular shape. Hence, the first opening is confined by a closed circular edge, the circular edge not being interrupted by radial notches or the like.

To connect the tube element with the attachment part, in one embodiment two bead sections are formed on the tube element, a first bead section carrying the at least one protrusion element and a second bead section being axially displaced with respect to the first bead section. The bead sections receive the attachment part in between themselves such that the attachment part is axially fixed to the tube element in between the bead sections.

In another aspect, a method for manufacturing an assembly group of a vehicle seat comprises: providing a tube element having a tube section extending along a longitudinal direction; connecting the tube element with an attachment part by inserting the tube element into a first opening formed in a planar section of the attachment part; forming a bead section on the tube element by deforming the tube element such that the bead section radially protrudes with respect to the tube section and abuts the planar section of the attachment part; and forming at least one protrusion element on the bead section, the at least one protrusion element engaging with at least one second opening formed in the planar section of the attachment part separate from the first opening.

In one aspect, the forming of the bead section and the forming of the at least one protrusion element on the bead section may be carried out during a single step by deforming the tube element for example by cold forming or by hot forming.

In one aspect, the at least one protrusion element may be formed on the bead section by stamping using a stamping device.

BRIEF DESCRIPTION OF THE DRAWINGS

The various features and advantages of the present invention may be more readily understood with reference to the following detailed description and the embodiments shown in the drawings. Herein.

FIG. 2 shows the attachment part in a separate view;

FIG. 3 shows another view of the tube element in connection with the attachment part;

FIG. 4 shows a top view of the assembly group;

FIG. 6 shows a view of an assembly group according to another embodiment;

FIG. 7 shows a separate view of the attachment part according to the embodiment of FIG. 6.

DETAILED DESCRIPTION

Figure 1:
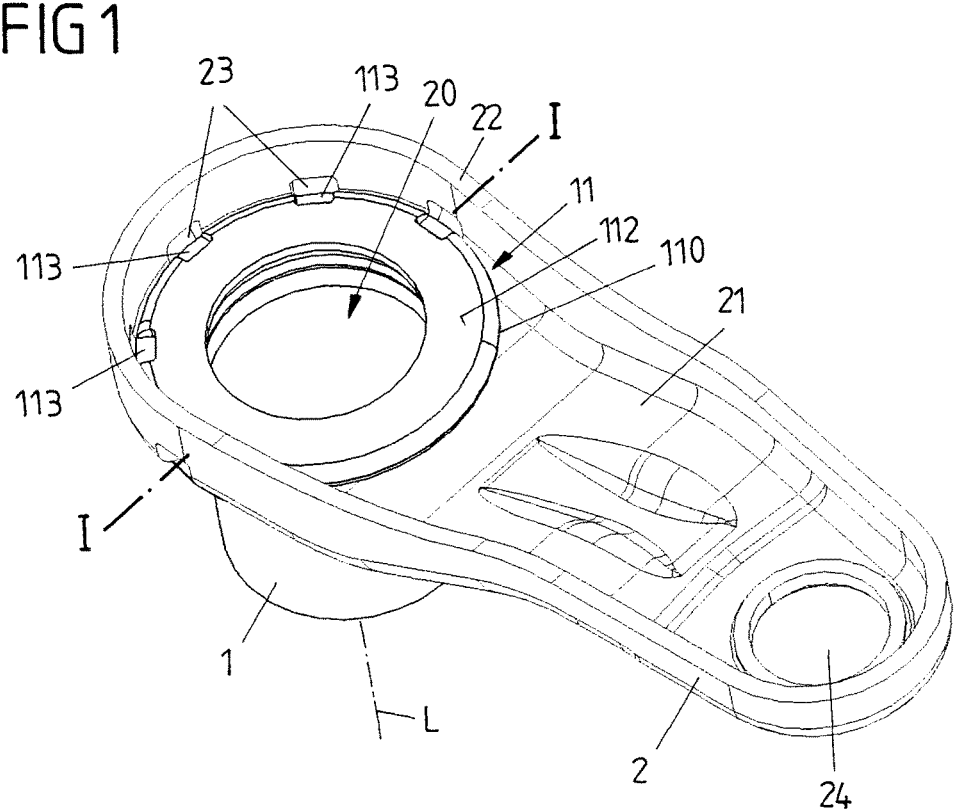
FIG. 1 shows an assembly group comprising a tube element and an attachment part connected to the tube element.

Subsequently, embodiments of the invention shall be described in detail with reference to the drawings. In the drawings, like reference numerals designate like structural elements.

It is to be noted that the embodiments are not limiting for the invention, but merely represent illustrative examples.

FIG. 1 shows in a perspective view an assembly group of a vehicle seat comprising a tube element 1 and an attachment part 2 in the shape of a link fixedly connected to the tube element 1. The tube element 1 may form for example a transverse tube extending in between frame parts of a vehicle seat. The attachment part 2 may for example be a link of a height adjustment mechanism of a vehicle seat.

Within a height adjustment mechanism of a vehicle seat, the tube element 1 may for example be mounted pivotably in between frame parts on opposite sides of a seat part of the vehicle seat. The attachment part 2 in the shape of the link herein is connected to the tube element 1 in a torsionally locked manner such that the attachment part 2 is pivoted together with the tube element 1 when driving the tube element 1 or the attachment part 2 for example using a suitable drive device such as an electric drive. The attachment part 2 in the shape of the link may for example be connected via an opening 24 at a far end of the attachment part 2 (opposite to the end to which the tube element 1 is connected) to a guide rail of a longitudinal adjustment mechanism of the vehicle seat such that, by pivoting the attachment part 2, the vehicle seat may be adjusted in its height position.

The attachment part 2, as visible in FIG. 2, comprises a planar section 21 and an opening 20 formed therein. The planar section 21 herein is substantially planar, which shall be understood to mean that the section in a substantially planar fashion extends along a plane, but may include a curvature as visible in FIG. 2, such that the planar section 21 not necessarily is entirely flat. The opening 20 through which the tube element 1 extends when it is connected to the attachment part 1 is formed in the planar section 21 and is confined by a circular edge 200, thus forming a circular hole 20.

The planar section 21 is surrounded by a flange 22 protruding from the planar section 21 along a longitudinal direction L along which the tube element 1 extends when it is connected to the attachment part 2. The flange 22 may for example serve to increase the structural stability of the attachment part 2.

As visible from FIG. 2, openings 23 are formed in a transition zone between the planar section 21 and the flange 22 radially outside the central opening 20 through which the tube element 1 extends. Such openings 23 are placed along a semi-circle around the central opening 20.

Figure 5:
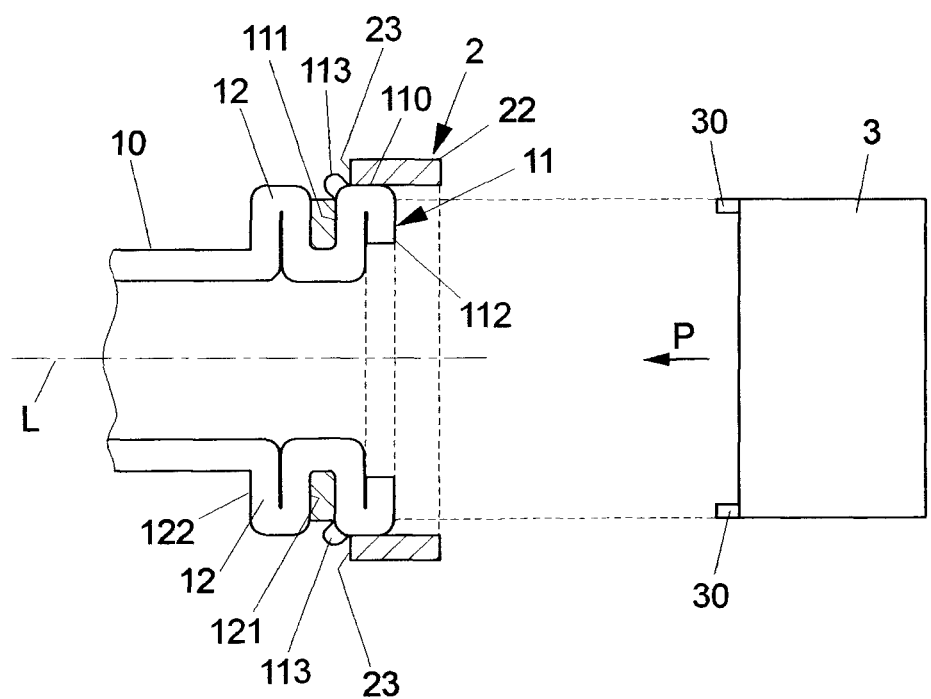
FIG. 5 shows a sectional view along the line I-I according to FIG. 1.

As visible from FIGS. 3 and 4 in combination with FIG. 5, the attachment part 2 is axially fixed to the tube element 1 by means of two bead sections 11, 12 formed on the tube element 1. The bead sections 11, 12 may for example be formed by cold forming or by hot forming the tube element 1 such that the attachment part 2 is received in between the bead sections 11, 12 and thus is axially fixed to the tube element 1, as shown for example in FIG. 5.

For connecting the attachment part 2 to the tube element 1, an axially inner bead section 12 is formed on the tube element 1 such that the bead section 12 radially protrudes from a non-deformed tube section 10. The tube element 1 is then inserted with its free end adjoining the bead section 12 into the opening 20 of the attachment part 2 such that the bead section 12 abuts, with an inner side 121 opposite an outer side 122, the planar section 21 around the opening 20 of attachment part 2. Subsequently, an axially outer bead section 11 is formed on the tube element 1, thus axially fixing the attachment part 2 to the tube element 1.

While forming the axially outer bead section 11, or after forming the axially outer bead section 11, protrusion elements 113 are formed on the bead section 11 by suitably deforming the bead section 11 using a stamping technique. For example, a stamp device 3 (see FIG. 5) may be used having deformation elements 30 for acting onto the bead section 11, thus deforming the bead section 11 to form the protrusion elements 113 on the bead section 11.

Herein, the protrusion elements 113 are formed such that the protrusion elements 113 engage with the openings 23 of the attachment part 2. Via the engagement the attachment part 2 is torsionally locked to the tube element 1 such that torsional forces may be transferred in between the tube element 1 and the attachment part 2.

As visible for example from FIG. 1 and FIG. 3 in combination with FIG. 5, the protrusion elements 113 on the bead section 11 are formed by stamping using a suitable stamping device 3 acting onto an axially outer side 112 of the bead section 11 in a stamping direction P, such that material of the bead section 11 is stamped from the bead section 11 to project at an axially inner side 111 from the bead section 11 into the openings 23 of the attachment part 2. Due to the deformation of the bead section 11 when acting onto the bead section 11 material is made to flow into the openings 23 formed on the attachment part 2 such that a torsional lock between the attachment part 2 and the tube element 1 is established.

Because the protrusion elements 113 are formed at a radially outer edge 110 of the bead section 11, an effective lever arm (effective in between the central longitudinal axis of the tube element 1 and the radial position of the protrusion elements 113) for the torsional lock between attachment part 2 and the tube element 1 is increased such that torsional forces may be received in a beneficial manner.

Furthermore, because the protrusion elements 113 are formed at the radially outer edge 110, the risk for damaging the bead section 11 when forming the protrusion elements 113 is low even if the tube element 1 is for example made from a high-strength steel material.

In another embodiment of an assembly group as shown in FIGS. 6 and 7, an attachment part 2 is provided having a planar section 21 which is not surrounded by an axially protruding flange. Again, a torsional lock between the attachment part 2 and a tube element 1 is achieved by means of protrusion elements 113 formed on a bead section 11 and reaching into openings 23 formed radially outside of a central opening 20 through which the tube element 1 extends.

The openings 23 radially outside of the central opening 20 in the embodiments of FIGS. 1 to 5 and FIGS. 6 and 7 each may have a curved shape. This however is not to be understood as limiting. In general, the openings 23 may have any desired shape.

A multiplicity of openings 23 may be placed around the central opening 20 on the attachment part 2. In principle, herein, one opening 23 is sufficient to establish a torsional lock, wherein by providing multiple openings 23 a distribution of torsional forces across the attachment part 2 and across the bead section 11 can be achieved.

The openings 23 may be equally spaced around the central opening 20, wherein in principle any regular or irregular placement of the openings 23 around the central opening 20 is conceivable.

As visible for example from FIG. 2 and from FIG. 7, the openings 23 are separate from the central opening 20. In particular, there is no connection between the openings 20, 23, but the openings 20, 23 are separated from one another by material portions of the planar section 21 of attachment part 2. Thus, the circular shape of the central opening 20 is not interrupted by the openings 23, providing for a beneficial reception of the tube element 1 within the opening 20.

Both the tube element 1 and the attachment part 2 may be made for example from a steel material.

The embodiments described herein are not limiting for the invention as set forth in the claims, but merely provide illustrative examples. The invention can be carried out in an entirely different manner in entirely different embodiments.

REFERENCE NUMERALS

1 Tube element
10 Tube section
11, 12 Deformation section (bead)
110 Outer edge
111, 121 First side
112, 122 Second side
113 Protrusion element
2 Attachment part
20 Opening
200 Edge
21 Planar section
22 Flange section
23 Openings
3 Stamping device
30 Deformation element
L Longitudinal direction
P Stamping direction

The invention claimed is:

1. Assembly An assembly group of a vehicle seat, the assembly group comprising:
   a tube element having a tube section extending along a longitudinal direction and a bead section formed on the tube element and radially protruding with respect to the tube section;
   an attachment part connected in a torsionally locked manner to the tube element and having a planar section and a first opening formed in the planar section, wherein the tube element extends through the first opening such that the tube element with the bead section abuts the planar section of the attachment part;
   wherein the attachment part comprises at least a second opening separate from the first opening; and
   wherein the bead section comprises at least one protrusion element engaging with the second opening for torsionally locking the tube element with respect to the attachment part, wherein the at least one protrusion element is formed on the bead section by stamping.

2. Assembly The assembly group according to claim 1, wherein the at least one protrusion element protrudes at least one of axially and radially with respect to the longitudinal direction from the bead section.

3. Assembly The assembly group according to claim 1, wherein the at least one protrusion element is formed on a radially outer edge of the bead section.

4. Assembly The assembly group according to claim 1, wherein one protrusion element engages with each second opening.

5. Assembly The assembly group according to claim 1, wherein at least one second opening is formed on the planar section.

6. Assembly The assembly group according to claim 1, wherein at least one second opening is formed on a flange of the attachment part, the flange protruding axially along the longitudinal direction from the planar section.

7. Assembly The assembly group according to claim 6, wherein the flange extends around the planar section to encompass the planar section.

8. Assembly The assembly group according to claim 1, wherein the first opening is confined by a closed circular etch.

9. Assembly The assembly group according to claim 1, wherein the tube element comprises a first bead section carrying the at least one protrusion element and a second bead section axially displaced with respect to the first bead section, wherein the attachment part is received in between the first bead section and the second bead section.

10. An assembly group of a vehicle seat, the assembly group comprising:
    a tube element having a tube section extending along a longitudinal direction and a bead section formed on the tube element and radially protruding with respect to the tube section;
    an attachment part connected in a torsionally locked manner to the tube element and having a planar section and a first opening formed in the planar section, wherein the tube element extends through the first opening such that the tube element with the bead section abuts the planar section of the attachment part;
    wherein the attachment part comprises a multiplicity of second openings which are arranged radially outside of the first opening and are displaced with respect to one another; and
    wherein the bead section comprises at least one protrusion element engaging with one second opening for torsionally locking the tube element with respect to the attachment part, wherein the at least one protrusion element engages with at least one of the second openings.

11. The assembly group according to claim 10, wherein one protrusion element engages with each second opening.

12. The assembly group according to claim 10, wherein the at least one protrusion element protrudes at least one of axially and radially with respect to the longitudinal direction from the bead section.

13. The assembly group according to claim 10, wherein the at least one protrusion element is formed on a radially outer edge of the bead section.

14. An assembly group of a vehicle seat, the assembly group comprising:
    a tube element having a tube section extending along a longitudinal direction and a bead section formed on the tube element and radially protruding with respect to the tube section;
    an attachment part connected in a torsionally locked manner to the tube element and having a planar section and a first opening formed in the planar section, wherein the tube element extends through the first opening such that the tube element with the bead section abuts the planar section of the attachment part;
    wherein at least one second opening is formed on a flange of the attachment part, the flange protruding axially along the longitudinal direction from the planar section; and
    wherein the bead section comprises at least one protrusion element engaging with one second opening for torsionally locking the tube element with respect to the attachment part.

15. The assembly group according to claim 14, wherein the flange extends around the planar section to encompass the planar section.

16. The assembly group according to claim 14, wherein the at least one protrusion element protrudes at least one of axially and radially with respect to the longitudinal direction from the bead section.

17. The assembly group according to claim 14, wherein the at least one protrusion element is formed on the bead section by stamping.

18. The assembly group according to claim 14, wherein the at least one protrusion element is formed on a radially outer edge of the bead section.

* * * * *

UNITED STATES PATENT AND TRADEMARK OFFICE
CERTIFICATE OF CORRECTION

PATENT NO. : 9,701,227 B2  
APPLICATION NO. : 14/878236  
DATED : July 11, 2017  
INVENTOR(S) : Anthony Ferenc Page 1 of 1

It is certified that error appears in the above-identified patent and that said Letters Patent is hereby corrected as shown below:

In the Claims

| | |
|---|---|
| Column 6, Line 51, Claim 1 | Delete "Assembly An assembly", Insert --An assembly-- |
| Column 7, Line 3, Claim 2 | Delete "Assembly The assembly", Insert --The assembly-- |
| Column 7, Line 8, Claim 3 | Delete "Assembly The assembly", Insert --The assembly-- |
| Column 7, Line 11, Claim 4 | Delete "Assembly The assembly", Insert --The assembly-- |
| Column 7, Line 14, Claim 5 | Delete "Assembly The assembly", Insert --The assembly-- |
| Column 7, Line 17, Claim 6 | Delete "Assembly The assembly", Insert --The assembly-- |
| Column 7, Line 21, Claim 7 | Delete "Assembly The assembly", Insert --The assembly-- |
| Column 7, Line 24, Claim 8 | Delete "Assembly The assembly", Insert --The assembly-- |
| Column 7, Line 27, Claim 9 | Delete "Assembly The assembly", Insert --The assembly-- |

Signed and Sealed this  
Sixteenth Day of October, 2018

Andrei Iancu  
*Director of the United States Patent and Trademark Office*